United States Patent [19]
Tokar et al.

[11] Patent Number: 5,935,284
[45] Date of Patent: *Aug. 10, 1999

[54] FILTER CARTRIDGE

[75] Inventors: Joseph C. Tokar; Mervin E. Wright, both of Apple Valley; Timothy H. Grafe, Edina; James A. LeBlanc, Eden Praire, all of Minn.

[73] Assignee: Donaldson Company, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/757,239

[22] Filed: Nov. 27, 1996

Related U.S. Application Data

[63] Continuation of application No. 08/680,751, Jul. 15, 1996, abandoned, which is a continuation of application No. 08/425,584, Apr. 20, 1995, abandoned, which is a division of application No. 08/353,640, Dec. 12, 1994, Pat. No. 5,454,858, which is a division of application No. 08/107,967, Aug. 16, 1993, Pat. No. 5,415,676.

[51] Int. Cl.$^6$ .................................................. B01D 46/00
[52] U.S. Cl. ................................ 55/485; 55/486; 55/487; 55/498; 55/510; 55/524; 55/527; 95/285; 95/287
[58] Field of Search ............................... 55/500, 372, 379, 55/382, 485, 486, 487, 498, 510, 524, 527, 528; 95/285, 287; 96/191

[56] References Cited

U.S. PATENT DOCUMENTS

| | | |
|---|---|---|
| 3,290,870 | 12/1966 | Jensen . |
| 3,339,347 | 9/1967 | Otto ...................................... 55/500 X |
| 3,488,928 | 1/1970 | Tarala . |
| 3,796,416 | 3/1974 | Knudson .............................. 55/500 X |
| 3,802,160 | 4/1974 | Foltz . |
| 3,907,531 | 9/1975 | Lee et al. ............................... 55/500 X |
| 4,018,686 | 4/1977 | Shufflebarger et al. .............. 55/500 X |
| 4,160,684 | 7/1979 | Berger, Jr. . |
| 4,211,543 | 7/1980 | Tokar et al. . |
| 4,243,397 | 1/1981 | Tokar et al. . |
| 4,452,619 | 6/1984 | Wright et al. . |
| 4,477,270 | 10/1984 | Taugh ....................................... 55/486 |
| 4,676,807 | 6/1987 | Miller et al. . |
| 4,759,782 | 7/1988 | Miller et al. . |
| 4,861,479 | 8/1989 | Solzer ................................... 55/500 X |
| 4,878,929 | 11/1989 | Tofsland et al. . |
| 5,082,476 | 1/1992 | Kahlbaugh et al. . |
| 5,129,923 | 7/1992 | Hunter et al. . |
| 5,154,742 | 10/1992 | Gault et al. . |
| 5,238,474 | 8/1993 | Kahlbaugh et al. . |
| 5,290,330 | 3/1994 | Tepper et al. . |
| 5,306,321 | 4/1994 | Osendorf . |
| 5,415,676 | 5/1995 | Tokar et al. . |
| 5,454,858 | 10/1995 | Tokar et al. . |
| 5,605,748 | 2/1997 | Kennedy et al. ......................... 55/486 |

FOREIGN PATENT DOCUMENTS

| | | |
|---|---|---|
| 0 208 515 | 1/1987 | European Pat. Off. . |
| 34 44 387 A1 | 7/1985 | Germany . |
| 630886 | 12/1961 | Italy . |
| 2 152 399 | 8/1985 | United Kingdom . |
| 2 197 802 | 6/1988 | United Kingdom . |
| WO 89/07484 | 8/1989 | WIPO . |

OTHER PUBLICATIONS

Brochure entitled "Torit Mist Collectors", Donaldson Company, Inc., Copyright May 1984.
Brochure entitled "Introducing X–845, Scotchban Chemistry Takes on a New Element", 3M, Copyright 1991.

*Primary Examiner*—C. Scott Bushey
*Attorney, Agent, or Firm*—Merchant & Gould P.C.

[57] ABSTRACT

A filter cartridge includes a cylindrical inner filter, and a removable and replaceable outer filter of media. The removable and replaceable filter includes more than one layer of media therein. One application for the filter cartridge is in a mist collector arrangement.

17 Claims, 5 Drawing Sheets

FILTER CARTRIDGE

CROSS-REFERENCE TO RELATED APPLICATIONS

This application is a continuing application of U.S. patent application Ser. No. 08/680,751, filed Jul. 15, 1996, now abandoned; application Ser. No. 08/680,751 is a Continuation of application Ser. No. 08/425,584, filed Apr. 20, 1995, now abandoned; application Ser. No. 08/425,584 is a divisional of application Ser. No. 08/353,640, filed Dec. 12, 1994, now U.S. Pat. No. 5,454,858; application Ser. No. 08/353,640 is a divisional of Ser. No. 08/107,967, filed Aug. 16, 1993, now U.S. Pat. No. 5,415,676; which applications and patents are incorporated herein by reference. It is noted that the enclosed specification has been modified from Ser. No. 08/680,751, although entitlement to priority, for the claims, is nevertheless asserted.

SUMMARY OF THE INVENTION

According to the present invention, there is provided a filter cartridge construction comprising a cylindrical inner filter having an outer liner, and a removable and replaceable filter of media positioned in covering relation to the outer liner. The removable and replaceable filter preferably includes more than one layer of media therein.

One application for the filter cartridge construction is in a mist collector arrangement. Such an arrangement is used to filter airborne liquids, from air. A mist collector arrangement is depicted in the drawings, as one example of the application of technology described herein.

DETAILED DESCRIPTION OF THE PREFERRED EMBODIMENT

Figure 1:
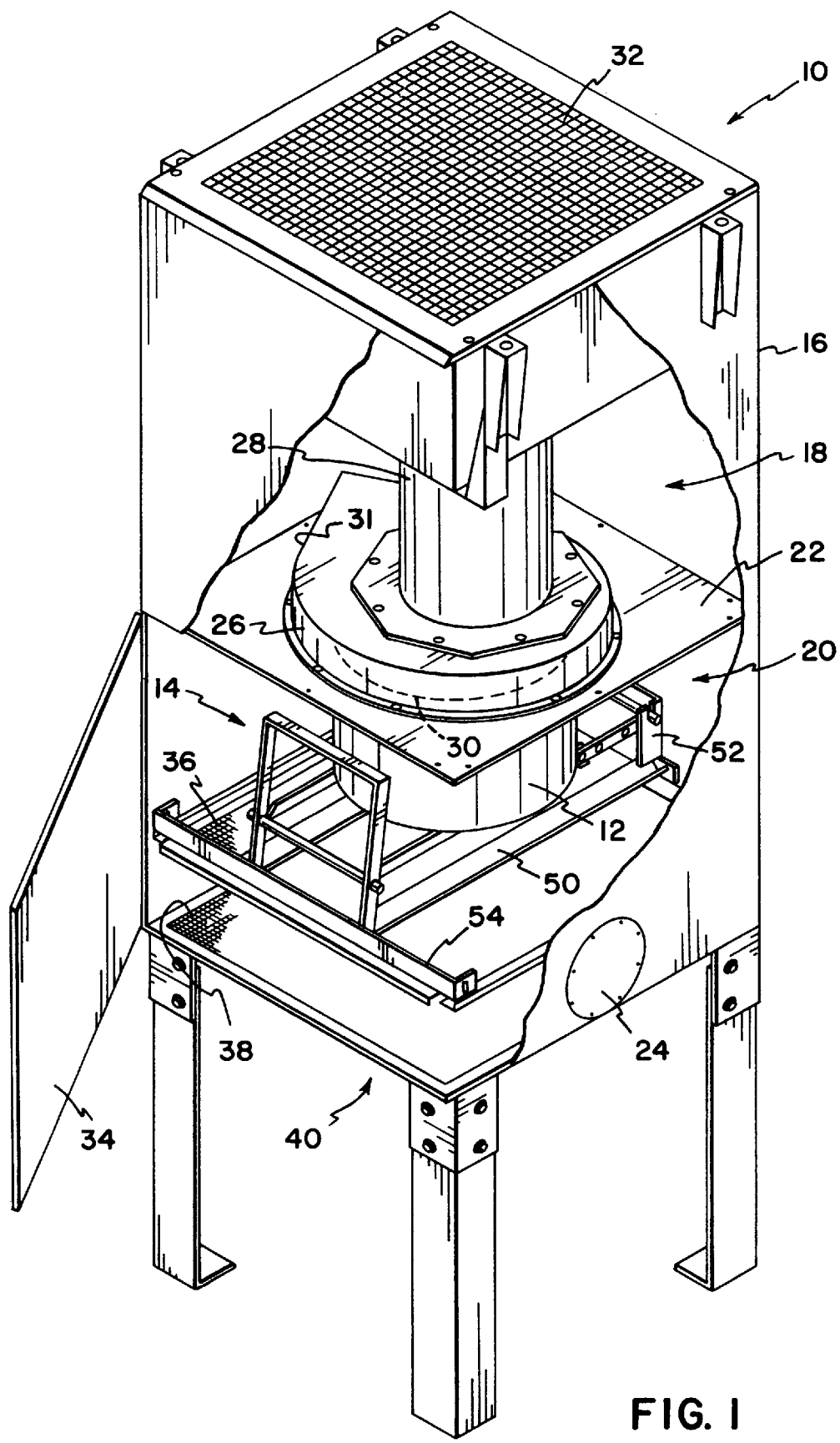
FIG. 1 illustrates a perspective view of a preferred system utilizing a filter cartridge retention mechanism and mist collector cartridge.

FIG. 1 illustrates a mist collection system 10 for use with the preferred mist collector cartridge 12. It will be understood by those skilled in the art that the illustrated mist collection system 10 is set forth only by way of example and is not intended to limit the scope of the invention. It will also be understood that the preferred filter cartridge retention mechanism 14 and mist collector cartridge 12 may be used in any suitable filtration system and are not limited to the illustrated mist collection system 10.

The mist collection system 10 preferably comprises a housing 16 with an upper chamber 18 and lower chamber 20 separated by a dividing wall 22 having an exhaust port opening 30. The upper chamber 18 preferably contains a blower housing 26 and motor 28 in fluid communication with the mist collector cartridge 12 by way of the exhaust port 30 opening.

A fan (not shown) in the blower housing 26 draws contaminated air into the lower chamber 20 through an air inlet port 24. The contaminated air is drawn through the sidewalls of the mist collector cartridge 12 and expelled through a blower opening 31 into the upper chamber 18. As pressure in the upper chamber 18 increases, the filtered air is forced through an outlet port 32 in the top of the mist collection system 10. A high efficiency particulate air (HEPA) filter (not shown) may be installed proximate the outlet port 32 in the upper chamber 18 as a final stage filter.

A door 34 is provided on the front of the lower chamber 20 through which the mist collector cartridge 12 can be inserted or removed. An upper screen 36 and lower screen 38 are preferably located in the lower chamber 20 of the mist collection system 10 above and below the air inlet port 24, respectively. The upper and lower screens 36, 38 prevent particulates, such as metal shavings, from being drawn into the mist collection cartridge 12 or from falling into a hopper 40 at the bottom of the mist collection system 10.

The mist collector cartridge 12 is preferably retained in the lower chamber 20 of the mist collection system 10 by the filter retention mechanism 14. The preferred filter cartridge retention system 14 contains a pair of V-shaped angled slides 50 which extend from a rear pivot bracket 52 mounted on the rear of the mist collection system 10 to a front bracket 54 attached to the mist collection system 10 proximate the door 34.

Figure 2:
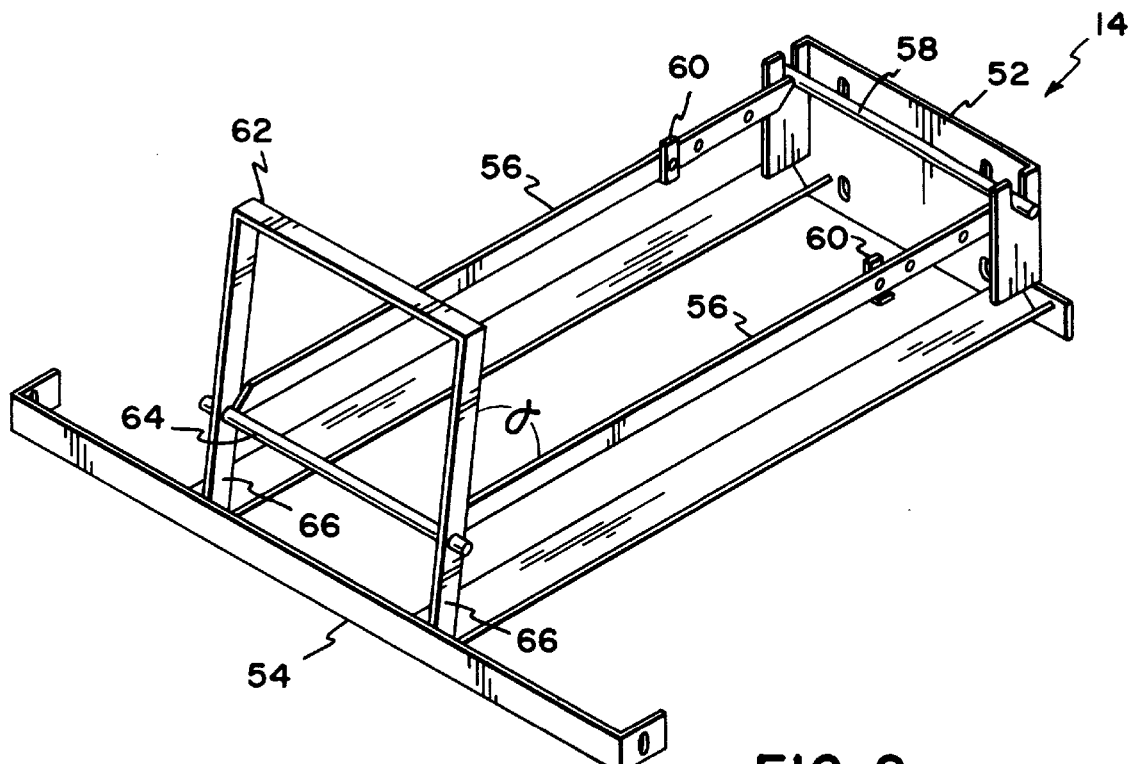
FIG. 2 is a perspective view of a filter cartridge retention mechanism in an operational position.

FIG. 2 illustrates the preferred filter cartridge retention system 14 locked in the operational position. A pair of support members 56 are pivotally attached to the rear pivot bracket 52 by a rear pivot rod 58. A pair of filter cartridge end stops 60 are attached to the support members 56 so that the mist collector cartridge 12 is correctly position within the filtration system 10 in fluid engagement with the exhaust port 30 in the dividing wall 22 (See FIG. 1). An elongated handle 62 is pivotally attached to the free ends of the support members 56 by a front pivot rod 64. The handle 62 preferably has a pair of feet 66 which simultaneously rest in the angle slides 50 and are wedged against the front bracket 54. The length of the support members 56 is determined so that the angle of the handle 62 with respect to the support members 56 is less than 90°. Consequently, the filter cartridge retention system 14 is capable of exerting significant upward force on the filter cartridge 12 without a danger of disengagement. The feet 66 of the handle 62 are preferably beveled (See FIG. 3) on the base of the handle 62 facilitate sliding in the angled slides 50. In the operational position, the beveled surfaces of the feet 66 rest securely against the back surface of the front bracket 54.

Figure 3:
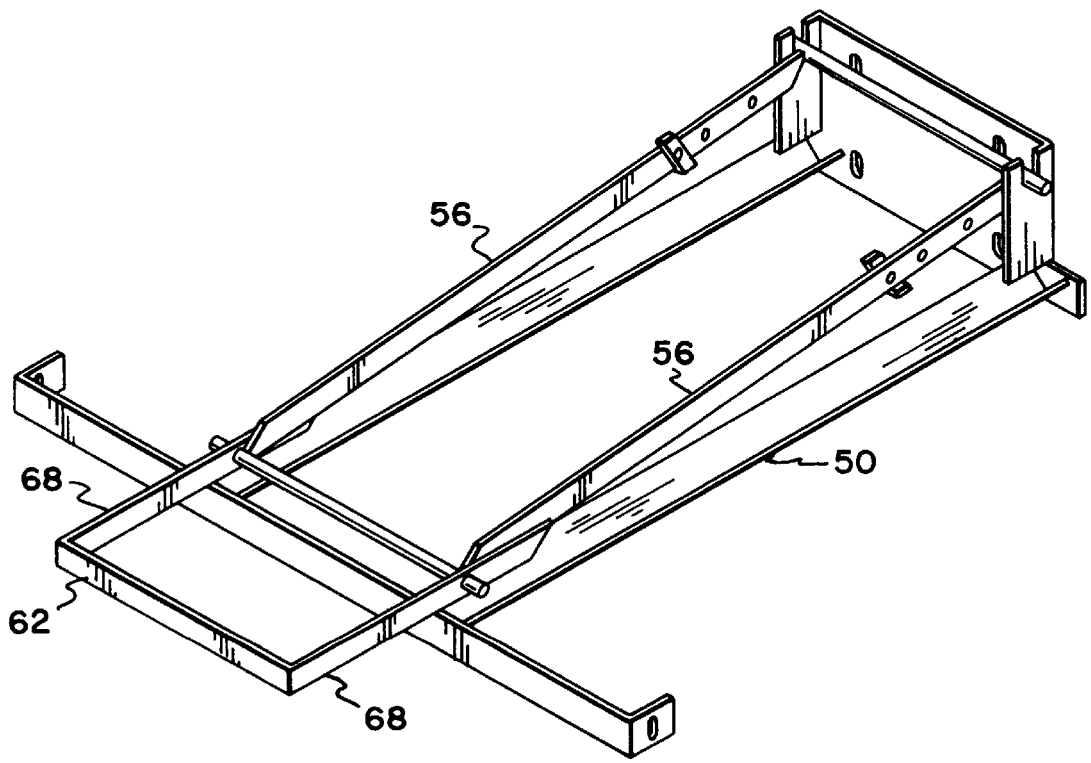
FIG. 3 is a perspective view of a filter cartridge retention mechanism in a reclined and released position.

FIG. 3 illustrates the filter cartridge retention system 14 in a reclined or released position. The feet of the handle 66 ride in the V-shaped angled slides 50 as the handle 62 is moved forward away from the mist collector cartridge 12. When the handle 66 is in the horizontal position, the support members 56 are angled downward toward the door 34 to allow easy insertion or removal of a mist collector cartridge 12. The handle 62 operates as an extension 68 of the support members 56 to facilitate insertion and removal of a mist collector cartridge 12. When the handle is in the horizontal position, it extends out from the doorway, preventing the door 34 from being closed unless the filter cartridge retention system 14 is in the operational position.

It will be understood by those skilled in the art that the components of the filter cartridge retention system 14 can be changed or modified without departing from the spirit or scope of the invention. For example, the support members 56 may be replaced by a single rigid pivot member. Likewise, the handle may be configured as a solid member pivotally attached to a support members.

Figure 4:
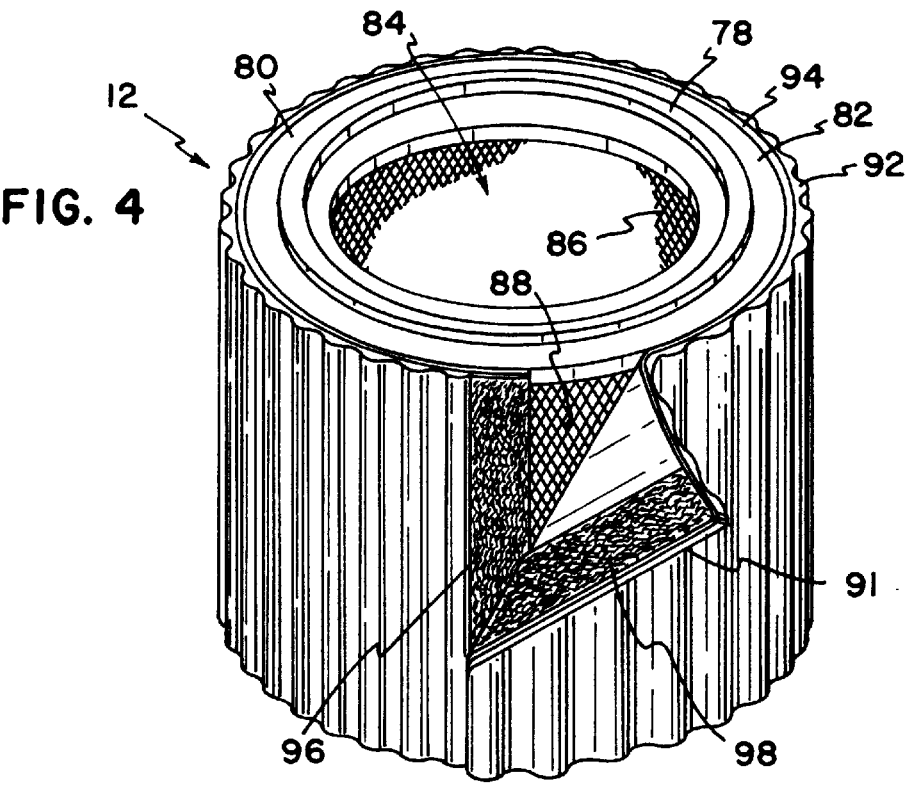
FIG. 4 is a perspective view of one embodiment of the cartridge with a multiple layer pre-filter wrap.
Figure 5:
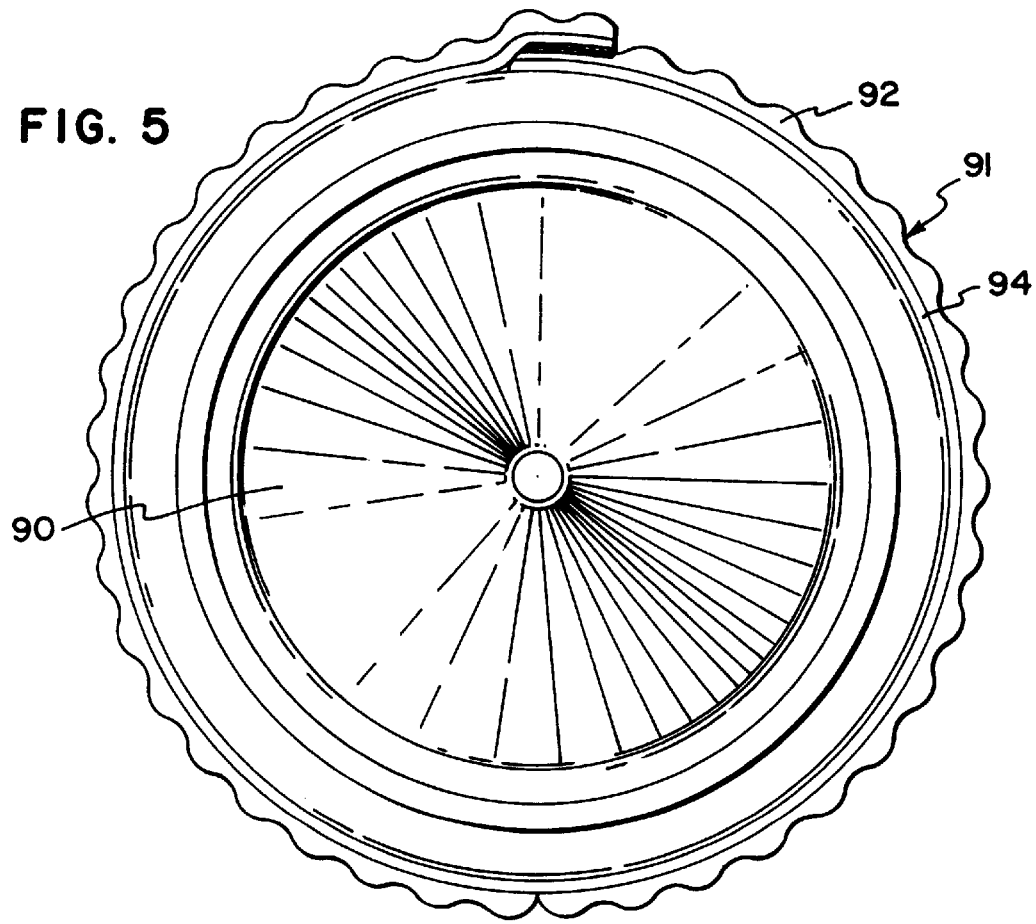
FIG. 5 is a top view of the cartridge of FIG. 4.

FIG. 4 illustrates an embodiment of the mist collector cartridge 12 of the present invention. Filter support members 80 preferably include a circular top member or top end cap 82 having a top opening 84, perforated inner and outer filter sidewalls or liners 86, 88 and a bottom end cap 90 (See FIG. 5). The top end cap 82 preferably contains a compression gasket 78 to insure fluid tight engagement with the exhaust port 30. The support members 80 may be constructed of any suitable material, including metal or plastic.

The perforated outer filter sidewall 88 is preferably covered with a pre-filter wrap 91. The pre-filter wrap illustrated in FIGS. 4 and 5 comprises a corrugated outer wrap 92 and a generally flat inner wrap 94. The inner and outer pre-filter wraps 92, 94 may be joined by a seam (not shown) along hook and loop portions 96, 98. Such hook and loop fasteners 96, 98 are sold under the trade name VELCRO. The pre-filter wrap 91 is attached to the filter support members 80 by use of the hook and loop fastener material 96, 98 on the edges of the pre-filter wrap 91 (See FIG. 5).

The pre-filter wrap 91 may be constructed of a foamed urethane material, also referred to as a fully open cellular filtration foam. A foam material suitable for this purpose is available under the trade name Filter Foam from Scott Foam Inc., Chester, Pa. The outer wrap 92 is preferably more porous than the inner wrap 94, allowing it to hold a greater quantity of liquid. The outer wrap 92 is preferably 0.75" thick, with approximately 45 pores/inch. The inner wrap 94 is preferably 0.25" thick with approximately 100 pores/inch. In operation, the foamed urethane wrap 91 holds liquid, but does not build resistance to air flow.

Figure 6:
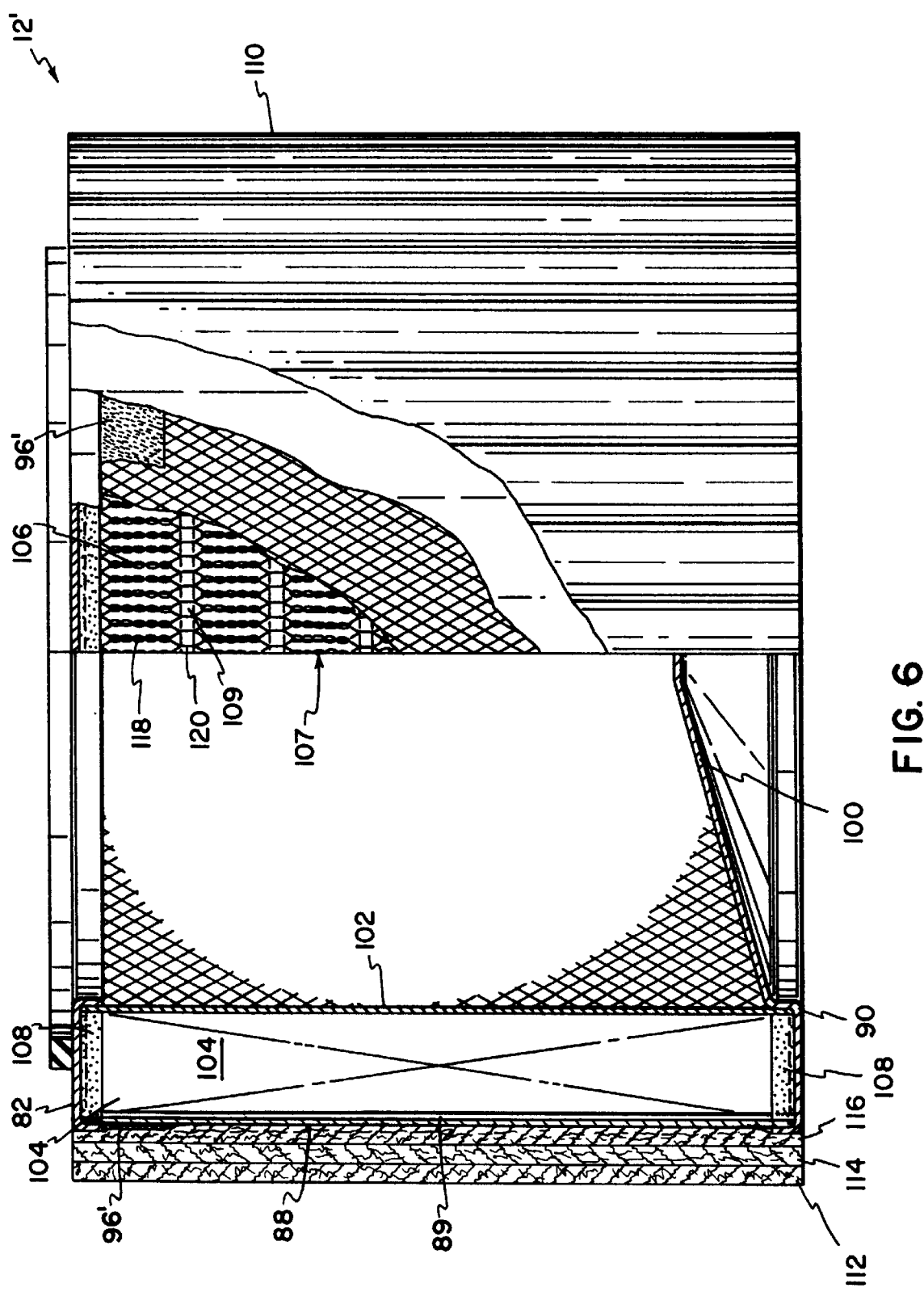
FIG. 6 is a sectional view of the cartridge using multiple layers of non-woven air-laid material as a pre-filter wrap.

FIG. 6 illustrates a sectional view of the preferred mist collector cartridge 12' of the present invention. The bottom end cap 90 preferably has a sloped portion 100 which allows oil that is collected on the inner surface 102 of cartridge 12' to drain through filter media 104 and into the hopper 40.

The filter media 104 preferably comprises a synthetic glass and polyester material arranged to form a cylindrical pleated filter cartridge. The filter media 104 preferably has a high efficiency, between 70 and 90 percent at 0.778 micron particles.

To keep pleats 107 correctly spaced, the filter media 104 is scored to create alternating rectilinear line portions 118 and curvilinear line portions 120. During the corrugation process, dimples 109 are integrally formed in the filter media 104 along the pleat tips 106 to maintain the spacing between the pleats 107. Construction of a corrugated filter media of this type is disclosed in U.S. Pat. No. 4,452,619, issued to Wright et al. on Jun. 5, 1984, which is hereby incorporated by reference into this specification.

As will be discussed below, as dirt and oil accumulate on the filter media 104, the media 104 become partically clogged so that the air flowing through the filter media 104 accelerates to create additional pressure on the filter media 104. In order for the filter media 104 to withstand the increased pressure, the pleats 107 are preferably spaced more closely together than on an air filter, giving the filter media 104 additional structural integrity. Because pleats on an ordinary air filter are generally spaced further apart, they would probably collapse under the air pressure in the present mist collection system.

The filter media 104 is preferably a low surface energy synthetic fiber matrix constructed from fibers having a thickness of less than 0.030". The filter media 104 may be treated with a low surface energy material, such as an aliphatic fluorocarbon. One low energy coating suitable for this purpose is sold under the trade name Scotchguard® or Scotchban® Protector, by 3M Corporation, St. Paul, Minn. Scotchban® Protector is described in brochure entitled *Introducing FX-845 Scotchban Chemistry Takes On A New Life*, dated 1991, which is hereby incorporated by reference into this specification. Low surface energy coatings and low surface energy materials create a low surface energy on the filter media 104 which facilitates agglomeration of the oil and promotes drainage. The pre-filter wraps 91, 110 may also be treated with a low surface energy material.

As is illustrated in FIG. 6, the filter media 104 is preferably recessed or set back from the inside surface of the outer liner 88 so that a space 89 is formed between the outer liner 88 and the filter media 104. The space 89 allows most of the oil that penetrates the pre-filter wrap 91 to form droplets on the inside surface of the pre-filter wrap 91 or the outer liner 88, rather than on the filter media 104.

The pleats 106 are arranged vertically in the cartridges 12, 12'. The filter media 104, and inner and outer liners 86, 88 are retained in the top and bottom end caps 82, 90 by a filter media adhesive 108, such as plastisol. The hook portion 96' of a fastener material may be retained between the outer liner 88 and the top end cap 82 around the perimeter of the mist collector cartridge 12' by the adhesive 108. The pre-filter wrap 82 may then be attached directly to the mist collector cartridge 12, 12'.

Oil mist too fine to collect on the outside surface of the filter media 104 may emerge on the inner surface 102 of the pleats 106. The vertical pleats 106 allow liquid collected on the inner surface 102 to drain downward onto the bottom end cap 90 of the cartridges 12, 12', where it passes through the filter media 104 and into the hopper 40.

Figure 7:
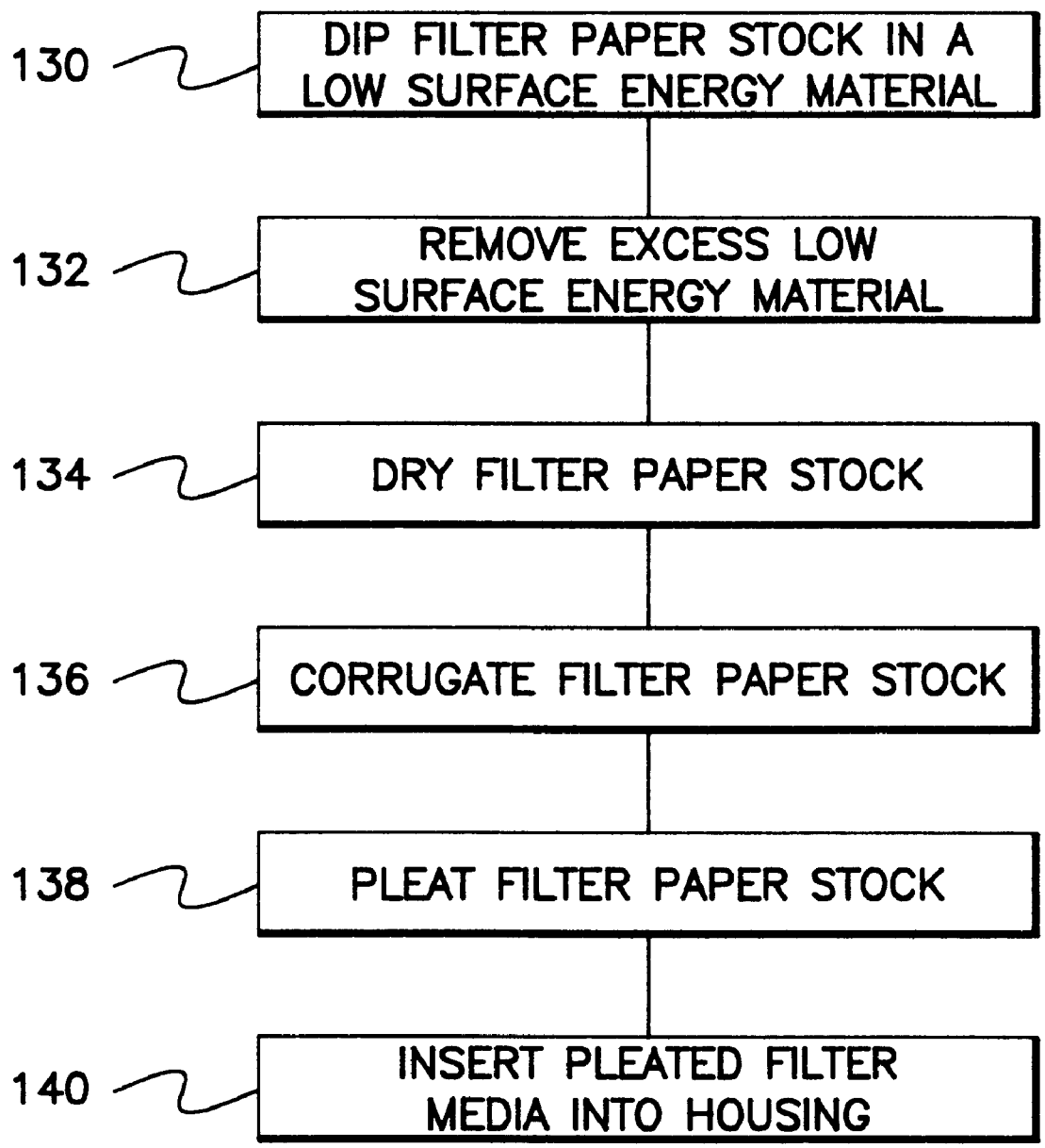
FIG. 7 is a flow chart illustrating the method of manufacturing the preferred mist collector cartridge.

The filter media 104 is preferably constructed according the flow chart illustrated in FIG. 7. The flat filter paper stock is preferably dipped in a low surface energy coating material 130, such as an aliphatic fluorocarbon. It should be understood that the paper stock may be treated or wetted by a variety of methods, including spraying. The excess coating material is removed by compressing the coated paper stock between a pair of compression rollers 132. The coated paper stock is then dried in a convection drying oven 134.

Prior to pleating, the paper stock is corrugated 136 by pressing a series of grooves lengthwise along the paper with a heated roller. The paper stock is then pleated 138 to form the filter media 104 and inserted into a filter housing 140. The preferred corrugation process is disclosed in U.S. Pat. No. 4,452,619 issued to Wright et al., previously incorporated by reference into this specification. It will be understood that the cylindrical filter cartridge illustrated herein is set forth by way of example only and that a variety of filter configurations are possible. For example, generally planar filter cartridges having suitable drainage mechanism may be used in place of the cylindrical cartridge.

FIG. 6 also illustrates the preferred pre-filter wrap 110 of the present invention. The pre-filter wrap 110 is preferably constructed of multiple layers of non-woven air-laid mediums, such as high loft air-laid or dry-laid materials. Because of the nature of the pre-filter wrap 110, it may be attached directly to the hook portion 96' without the use of the mating hook-portion.

In the preferred embodiment, the outer pre-filter layer 112 is approximately 0.75" of open material having a density of 6.7 ounces/sq. yd. and a solidity of 0.8%. A product meeting these specifications is sold under the trade name Airlaid Media by Comulus Fiber Corp. located in Charlotte, N.C. The two inner layers 114, 116 are approximately 0.25" of a high efficiency material having a density of 3.62 ounces/sq. yd. and a solidity of 1.6%. A product meeting these specifications is available from Chemwove Corp. in Charlotte, N.C.

The preferred pre-filter wrap 110 accumulates oil during operation of the mist collection system 10. As oil accumulates, the pressure drop across the filters 12, 12' increases. When the motor 28 in the blower housing 26 is turned-off, the oil accumulated in the pre-filter wrap 110 drains downward into the hopper 40. After the oil has drained, the pressure drop across the filters 12, 12' is reduced, thereby extending filter life.

In an alternate embodiment, the pre-filter wrap may be constructed of fiberglass or fiberglass wool filter media of various thicknesses and efficiencies, sold under the trade name Fiberglass Wool, by Schuller Filtration Corp. located in Vienna, W. Va. Fiberglass materials hold oil and increase the pressure drop across the filter as oil accumulates. By replacing the fiberglass pre-filter wrap periodically, the life of the filter media 104 may be extended.

Due to the low surface energy of the filter media 104, the media 104 retains less oil. In actual operation, oil droplets formed on the outside surface of the filter media 104 drain downward by gravity into the collection hopper 40. Any oil that passes through the media 104 and agglomerates on the inside surface 102 drains by gravity to the sloped portion of the bottom end cap 90 and passes back through the filter media 104 into the hopper 40. The agglomeration of the oil on the inside and outside surface of the media 104, in combination with the vertically oriented pleats 106, ensures that almost no oil is bled into the downstream air. Thus, the filter media 104 does not absorb the oil, but instead separates it and drains it off so that it can be collected and disposed of apart from the filter 12. In one applications, it is possible to recycle the collected fluid.

Further, because the filter media 104 is pleated, it has a large surface area which allows air flowing through the media 104 to move at a low velocity, reducing the tendency of oil to be blown off the inner surface 102 of the filter 12 into the downstream air.

In the preferred embodiment, the efficiency and pressure drop across the cartridges 12, 12' increase over time. The mist collector cartridge 12, 12' function for a long period of time because the media 104 does not become saturated with oil. As the filters 12, 12' become clogged with dirt and other particulates, the efficiency and the pressure drop across the filters 12, 12' increases. Therefore, the pressure drop across the filter 12, 12' corresponds to the amount of useful life remaining in the filters 12, 12', which can be used to indicate when the filters 12, 12' need to be replaced.

It will be understood by those skilled in the art that the present inventions are not limited to the examples discussed above, but may be changed or modified without departing from the spirit or scope of the invention. For example, a wide variety of filter cartridge configurations may be used in combination with a variety of drainage mechanisms. Further, it will be recognized that a variety of low surface energy fiber media may be utilized to facilitate the agglomeration and drainage of the collected oil.

We claim:

1. A filter cartridge comprising:
   (a) a cylindrical inner filter having a cylindrical region of filter media, an outer liner adjacent to the region of filter media, and at least a first end cap; and
   (b) a removable and replaceable sleeve filter of media positioned outside of said first end cap and in covering relation to said outer liner;
      (i) said removable and replaceable sleeve filter including more than one layer of media therein.

2. A filter cartridge according to claim 1 wherein:
   (a) said cylindrical inner filter comprises a pleated filter.

3. A filter cartridge according to claim 2 wherein:
   (a) said removable and replaceable filter of media includes a layer of foam media.

4. A filter cartridge according to claim 3 wherein:
   (a) said removable and replaceable filter of media includes two layers of media.

5. A filter cartridge according to claim 4 wherein:
   (a) said removable and replaceable filter includes two layers of foam media.

6. A filter cartridge according to claim 2 wherein:
   (a) said pleated filter comprises a pleated paper media.

7. A filter cartridge according to claim 6 wherein:
   (a) said pleated paper media comprises filter media treated with a low surface energy coating material.

8. A filter cartridge according to claim 2 wherein:
   (a) said removable and replaceable filter of media includes at least one layer of non-woven fibrous media therein.

9. A filter cartridge according to claim 8 wherein:
   (a) said removable and replaceable filter includes two layers of non-woven fibrous media therein.

10. A filter cartridge according to claim 8 wherein:
    (a) said removable and replaceable filter includes an outermost layer of media comprising fibrous media.

11. A filter cartridge according to claim 2 wherein:
    (a) said removable and replaceable filter includes an outermost layer of media comprising fibrous media.

12. A filter cartridge according to claim 1 wherein:
    (a) said removable and replaceable filter includes an outermost layer of media comprising fibrous media.

13. A filter cartridge according to claim 1 wherein:
    (a) said outer liner comprises a metal liner.

14. A filter cartridge according to claim 1 including:
    (a) an inner liner positioned inside of said cylindrical inner filter.

15. A filter cartridge according to claim 1 wherein:
    (a) said removable and replaceable filter includes two layers of media therein; an outermost one of said two layers of media being more porous than an innermost one of said two layers of media.

16. A filter cartridge according to claim 2 wherein:
    (a) said removable and replaceable filter includes at least two layers of media therein; an outermost one of said at least two layers of media having a greater porosity than an innermost one of said at least two layers of media.

17. A filter cartridge according to claim 1, wherein:
    (a) said inner filter further includes a second end cap disposed at an end opposite to said first end cap;
       (i) said removable and replaceable sleeve filter of media being positioned outside of said second end cap.

* * * * *